June 12, 1962
H. STATON
3,038,512
CONTAINER FORMED OUT OF AN INVERTED TIRE
CASING AND A METHOD THEREFOR
Filed Dec. 8, 1958
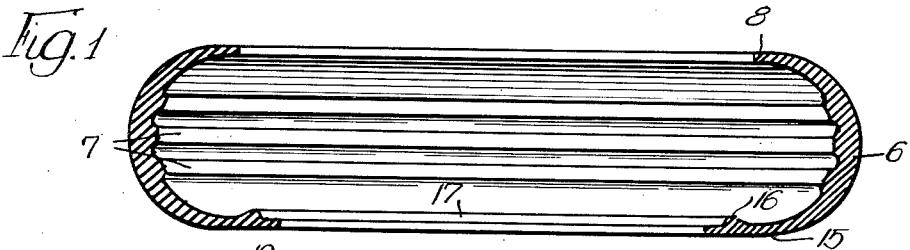
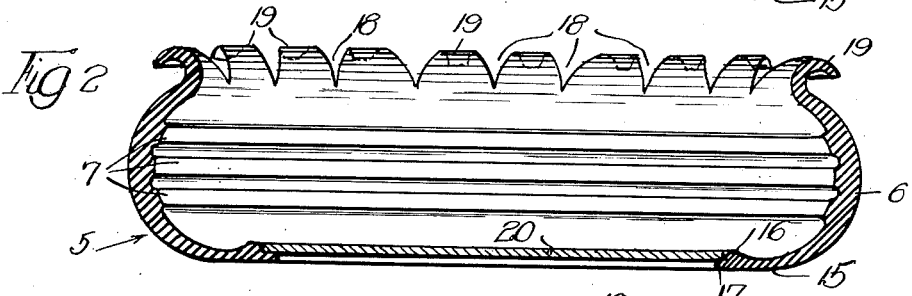
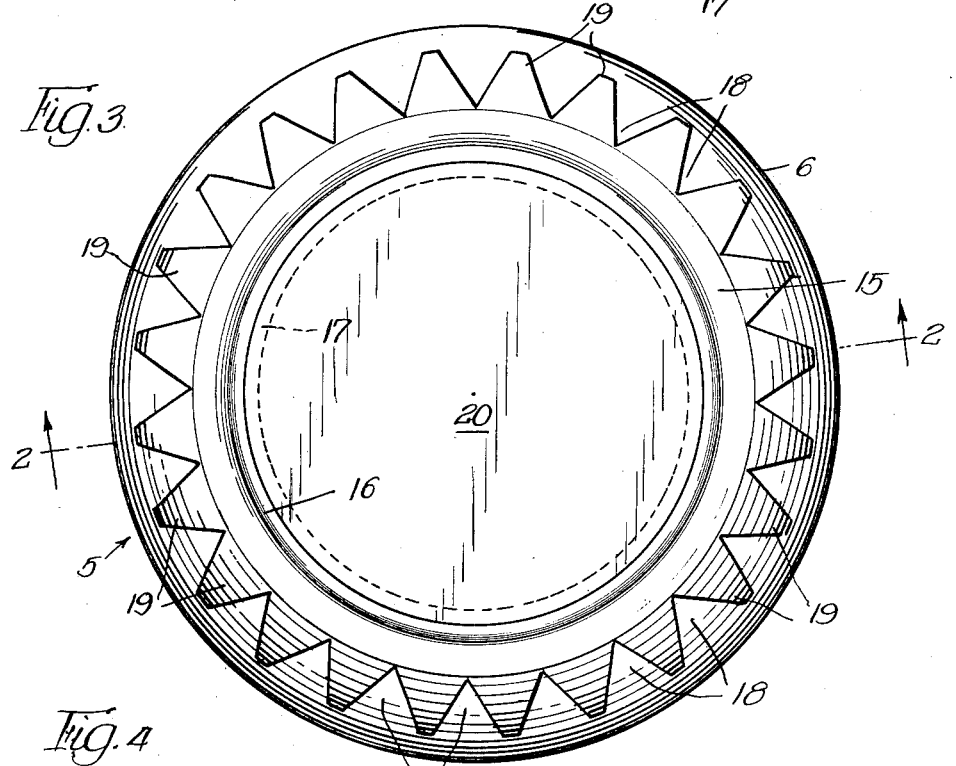
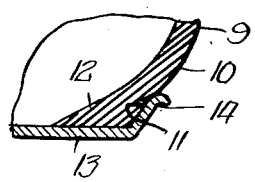
INVENTOR.
Hubert Staton,
BY

3,038,512
CONTAINER FORMED OUT OF AN INVERTED TIRE CASING AND A METHOD THEREFOR

Hubert Staton, 5331 S. Woodlawn Ave., Chicago, Ill.
Filed Dec. 8, 1958, Ser. No. 778,956
4 Claims. (Cl. 150—50)

The present invention relates to containers made out of used tire casings by inverting the same, that is turning them inside out, thereby deriving a measure of utility from old and worn out tire casings, which otherwise would be discarded as having little or no economic value.

One of the main objects of the present invention is the provision of decorative and attractive effect in the container as ultimately formed out of an old and worn out tire casing, which decorative and attractive effect may be brought about by utilizing the normal, inherent urge of the body of the casing to revert or spring back to its original position that it had prior to the inversion thereof.

Another object of the present invention is the provision in a container of the type indicated of decorative teeth or serrations, arranged around the mouth of the container, which teeth or serrations tending to flex in an outward direction due to the urge of the body portion of the tire casing in which said teeth or serrations have been made to revert or spring back to the original positional condition that they had while an integral part of the tire casing body prior to the inversion thereof may provide a decorative and attractive effect in the container as ultimately formed.

A still further object of the present invention is the provision of a suitable method of making a container out of an inverted tire casing, and imparting to the container a decorative and attractive effect hereinabove indicated by taking advantage of the inherent property of a portion of the body of the tire casing upon its inversion to revert or spring back to its original position that it had prior to the inversion of the casing.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views:

FIG. 1 is a diametrical cross sectional view of the tire casing upon its inversion, that is turning the same inside out, illustrating one of the initial steps in the method of forming a container;

FIG. 2 is a diametrical cross sectional view through the container as ultimately formed out of a tire casing, the view having been taken substantially on line 2—2 of FIG. 3;

FIG. 3 is a top plan view of the container as ultimately formed out of a tire casing in conformity with the present invention; and FIG. 4 is a fragmentary cross sectional view through an automobile wheel rim and the rim of one side of the tire casing, illustrating a detail in a tire casing and its relation in the container as ultimately formed by the inversion of the tire casing.

Referring to the present drawing, there is shown in FIGS. 2 and 3 a completed container, generally indicated by 5, as ultimately formed by inverting, that is turning inside out, of an automobile wheel tire casing, so that the shoe portion of the tire will define an arcuate side wall 6 of the container, with the thread 7 of the tire disposed inwardly of the ultimately formed container, as is seen in FIGS. 1 and 2.

As a first step in the formation of the container by the inversion of the tire casing, the rim portion of one side of the tire is completely severed, for effecting an abbreviated, inwardly extending section, which, upon inversion of the tire casing will define an inwardly directed annular flange 8, as seen in FIG. 1. The cutting off of the rim portion of one side of the tire casing, which upon inversion thereof ultimately defines said flange 8, will facilitate the manipulation of the tire casing, including extension through the opening defined by said flange 8 of the opposite side of the tire casing for the purpose of completing the inversion thereof and effecting the result of the inversion shown in FIG. 1.

Referring now to FIG. 4, normally side 9 of the tire includes bead 10, which defines a circumferential depression 11 adjacent the rim 12. The side of the tire by its rim portion 12 contacts rim 13 of an automobile wheel, while the rim flange 14 fits within said depression 11.

In the inverted condition of the tire to bring about container 5, one side of the tire, resulting from the tire side 9 of FIG. 4, will now define the bottom section 15, which, in the ultimately formed container 5, will define the container bottom upon which the container will be supported upon any ground such as floor or a garden surface.

In the container as ultimately formed by the inversion of a tire casing the outwardly disposed bead 10 at the rim of the tire side 9 will now be disposed inwardly of the container, in an upward direction, as at 16. Said bead 16, in conjunction with the inwardly disposed rim of the bottom section 15 will define a circumferential recess 17, which resulted from said depression 11 in the tire casing, as shown in FIG. 4, prior to the inversion of the tire. It is noted that both said flange 8 and said bottom section 15 by their inner body portions merge with the arc of said arcuate side wall 6 of container 5.

When the inversion of the tire casing has been completed to the extent shown in FIG. 1, a plurality of V-shaped notches 18 is made in flange 8, said notches 18 being of uniform size and being uniformly spaced in a circumferential relation with said flange 8, for defining a plurality of teeth or serrations 19, which result in said flange 8 from said notches 18. Preferably the apices of said notches should to some degree extend into the upper portion of the arcuate side wall 6 of the container 5.

Making of said notches 18 in said flange 8 will release the tensional force in said flange 8 and in the resulting teeth or serrations 19 inhering therein due to the inversion of the tire casing, and now said teeth or serrations 19 seeking to assume their original positional relation which they had while an integral part of the tire body prior to the inversion of the tire casing, will tend to flex upon an arc in an outward direction and away from the axial center of the container, as is clearly seen in FIG. 2. The ultimate position of said teeth or serrations 19 as ultimately assumed by them due to said outward arcuate flexing will be permanent, thereby imparting to the upper mouth or rim portion of the ultimately formed container a decorative and attractive effect.

From the hereinabove description it will be seen that the container made of the inverted tire casing, will now be used in a flat position, with the bottom section 15 providing a support upon which the ultimately formed container will be supported upon any ground such as a floor or a garden surface, while the decorative upper end brought about by said teeth or serrations 19 will be disposed at the upper end of the container.

As an alternative step of the procedure prior to the inversion of the tire, after the rim of one side of the tire has been severed, with the resultant flange 8 effected, notches 18 may then be made in the resulting flange, prior to the inversion of the casing. This alternative step in the procedure is particularly advantageous when the tire casing is stiff and consequently it would be difficult to turn the tire inside out by passing one side of the tire through the opening resulting in the flange 8. Therefore, the cutting of notches 18 prior to inversion of the tire will provide a larger mouth or opening at one side of the tire through which the other side of the tire may be passed in order to complete the inversion.

The container herein disclosed may be used indoors for filling the same with earth in which flowers or other plants may be planted. In the indoor use of the container disk 20, by its rim portion is supported within recess 17, for thereby providing a bottom for the container, as a continuation of the bottom section 15. Bead portion 16 in said bottom section 15 will provide an effective stop preventing said disk 20 from lateral shifting.

The container herein disclosed may also be used outdoors in the garden, and in such use the same functions as a wall retainer for earth deposited inwardly of the side wall 6. In this latter use bottom section 15 may contact directly with the surface of the garden ground. In this latter use disk 20 may be dispensed with, permitting plant roots to extend from the container in the garden ground through the opening defined by the rim of said bottom section 15.

Teeth or serrations 19 are broadly flaps of any desired contour, and not necessarily triangular. If notches 18 are square or rectangular, then the resulting flaps will have either square or rectangular form. For the purposes of this invention it is to be understood that teeth or serrations 19 are to include broadly flaps regardless as to their particular form.

While there are described herein preferred embodiments of the present invention, it is nevertheless to be understood that minor changes may be made therein without departing from the spirit and scope of the invention as claimed.

What I claim as new is:

1. A container comprising an inverted, inside-out tire casing having an outwardly bulging side wall defined by the shoe portion of the inverted tire casing, a bottom section defined by one side of the inverted tire casing, said bottom section constituting a support for the container, and a plurality of spaced, integral, decorative flaps arranged in a circumferential relation with the upper open mouth of the container as ultimately formed, said flaps having an arcuate, outwardly flaring position relative to the axial center of the container, said flaps being disposed in an overhanging relation with the bulge of said side wall, said flaps being fashioned out of the opposite side of the inverted tire casing, the positional relation of said flaps with the axial center of the container and with the bulge of said side wall being induced by the inherent property of said flaps to seek the original positional relation that inhered in said flaps while an integral part of the body of the tire casing prior to the inversion thereof.

2. A method of making a container out of a tire casing, comprising cutting off a rim portion in one side of the tire casing for thereby effecting a comparatively narrow strip adjacent one edge of the shoe portion of the tire casing, cutting out a plurality of spaced notches in said strip along the entire circumference and substantially co-extensively with the width thereof for thereby effecting a plurality of spaced flaps, and thereupon turning the said casing inside out, said flaps reverting to their original positional relation inherent while an integral part of the body of said strip prior to the cutting out of said notches by flaring in an outward direction away from the axial center of the container and thereby effecting an annular decorative element around the mouth of the container.

3. A method of making a container out of a tire casing, comprising cutting off a rim portion in one side of the tire casing for thereby effecting a comparatively narrow strip adjacent one edge of the shoe portion of the tire casing, cutting out a plurality of spaced notches in said strip along the entire circumference and substantially co-extensively with the width thereof for thereby effecting a plurality of spaced flaps, and thereupon turning the said casing inside out for inverting the same, and upon inversion of the tire casing, the shoe portion thereof constitutes the side wall of the container while the side of the tire casing opposite said one side constitutes the bottom supporting section for the container, said flaps in the formed container due to the inherent urge to revert to their original positional relation while an integral part of the body of said strip prior to the inversion of the tire casing flaring in an outward direction away from the axial center of the container effecting thereby an annular decorative element around the mouth of the formed container.

4. A method of making a container out of a tire casing, comprising the steps of cutting out a plurality of spaced notches along the entire inner circumference of, and substantially co-extensively with the width of one side of the tire casing for thereby effecting therein a plurality of spaced flaps, and thereupon turning the tire casing inside out for inverting the same, the cutting out of said notches, followed by the inversion of the tire casing, being capable of releasing the tensional force that inhered in said flaps while an integral part of the tire casing prior to the inversion thereof for thereby causing said flaps, upon the inversion of the tire casing, to assume a fixed, arcuate and outwardly flaring position in the direction away from the axial center of the container and thereby effecting an annular decorative element around the mouth of the ultimately formed container.

References Cited in the file of this patent

UNITED STATES PATENTS

| | | |
|---|---|---|
| 1,914,591 | Abe | June 20, 1933 |
| 2,184,904 | Boehme | Dec. 26, 1939 |
| 2,199,845 | Wolf | May 7, 1940 |
| 2,718,875 | Schaubel | Sept. 27, 1955 |

FOREIGN PATENTS

| | | |
|---|---|---|
| 781,338 | Great Britain | Aug. 21, 1957 |

OTHER REFERENCES

Science and Invention, May 1926, page 54, article and illustration, "Flower Garden."